United States Patent [19]
Stapfer

[11] 3,709,918
[45] Jan. 9, 1973

[54] BIS (MONOALKYLTIN) ORTHOSULFITES

[75] Inventor: Christian H. Stapfer, Newtown, Pa.

[73] Assignee: Cincinnati Milacron Chemicals Inc., Reading, Ohio

[22] Filed: March 24, 1971

[21] Appl. No.: 127,790

[52] U.S. Cl..........260/429.7, 260/45.75 K, 424/288, 252/431
[51] Int. Cl..............................C07f 7/22, C07f 45/56
[58] Field of Search....................................260/429.7

[56] References Cited

UNITED STATES PATENTS

| | | | |
|---|---|---|---|
| 3,037,039 | 5/1962 | Mazur | 260/429.7 |
| 3,095,434 | 6/1963 | Stamm | 260/429.7 |
| 3,150,161 | 9/1964 | Nunn | 260/429.7 |
| 3,201,432 | 8/1965 | Leebrick | 260/429.7 |
| 3,219,580 | 11/1965 | Stratton | 260/429.7 |
| 3,240,795 | 3/1966 | Ramsden | 260/429.7 |
| 3,391,174 | 7/1968 | Wowk | 260/429.7 |

*Primary Examiner*—Daniel E. Wyman
*Assistant Examiner*—Werten F. W. Bellamy
*Attorney*—Christen & Sabol

[57] ABSTRACT

Bis (monoalkyltin) orthosulfites, of the formula

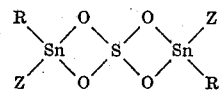

wherein R is an alkyl preferably having one to 12 carbon atoms and Z is hydroxy or a monovalent or divalent organic radical bonded to the tin through an oxygen or sulfur atom and can be prepared by oxidation of monoalkylthiostannoic acids with organic hydroperoxides, optionally followed by condensation with various functional groups. These novel orthosulfites are useful as condensation, polycondensation and polymerization catalysts; as fungicides, bactericides and stabilizers for synthetic polymers.

12 Claims, No Drawings

BIS (MONOALKYLTIN) ORTHOSULFITES

This invention relates to bis (monoalkyltin) orthosulfites and their preparation. More particularly, this invention relates to bis (hydroxy alkyltin) orthosulfites, condensation products thereof and the preparation thereof.

I have discovered that alkylthiostannoic acids can be oxidized with organic hydroperoxides in a hydrocarbon solvent, to yield bis (hydroxy alkyltin) orthosulfites according to the reaction:

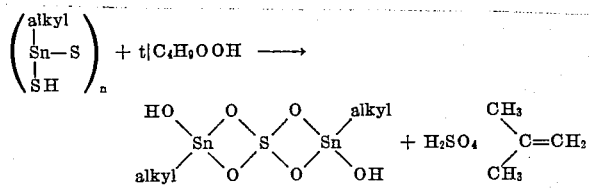

Under some reaction conditions, an increase in the molecular weight of compounds may be observed. These are assumed to be in the form of a polymeric stannoxy orthosulfite with terminal hydroxyl groups:

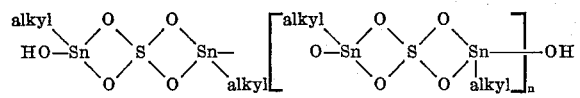

wherein $n$ is 1 to 20 and preferably 1 to 9.

The novel bis (monoalkyltin) orthosulfites of the present invention cannot be obtained by a conventional process, such as, the simple reaction of monoalkyltin oxides or stannoic acids with sulfuric acid. Such reactions lead invariably to monoalkylstannoxy acid sulfates of the structure

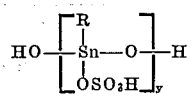

having a structure altogether different from that of the orthosulfites of the present invention.

Alkylthiostannoic acids having one to 20 carbons are suitable for practicing the present invention and groups containing one to 12 carbons are preferred. Some examples of alkylthiostannoic acids include methyl-, ethyl-, propyl-, isopropyl-, butyl-, isobutyl-, tert. butyl-, cyclohexyl-, octyl-, isooctyl-, decyl-, dodecyl-, pentadecyl-, and hexadecylthiostannoic acid. The preferred alkylthiostannoic acids are methyl-, butyl-, octyl-, and dodecylthiostannoic acids.

Organic hydroperoxides are suitable as a class as oxidizing agents for the reaction of the present invention. Examples of suitable hydroperoxides include methyl-, ethyl-, isopropyl-, buty-, tert. butyl-and triphenylmethyl-hydroperoxides; 3-hydroperoxycyclohexene and 2,3-dimethyl-3-hydroperoxybutene-1. These examples are representative of straight chain, branched chain, saturated and unsaturated organic hydroperoxides and are not intended as a complete list of suitable hydroperoxides.

Solvents for the reaction are the hydrocarbon liquids which form azeotropic, binary-phase system with water. The preferred solvents are n-hexane, benzene and toluene. Other suitable solvents include n-pentane, n-hepane, n-octane, i-octane, ethylbenzene and xylene. The boiling point of the solvent influences the molecular weight of the produce and suitable solvents can be selected from the class to obtain a product of the desired molecular weight. For example, if n-butyl thiostannoic acid is oxidized by tert butyl hydroperoxide using hexane as the solvent, the product appears to be monomeric, while if xylene is used the product is moderately polymeric. Toluene results in relatively short chain lengths, i.e., 5 to 10 repeat units.

Reaction temperatures may range from 30° to 300° C according to the peroxide used, and are preferably between 50° and 200° C.

I have also discovered that the bis(hydroxy (alkyl) tin) orthosulfites or hydroxylated poly (oxy alkylst annyl) orthosulfites of the present invention react quite easily with various functional groups such as anhydrides, acids, including sulfonic acids, alcohols and mercaptans leading to substituted bis (organotin) orthosulfites of the structure

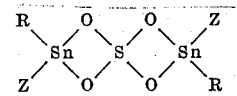

wherein R is the same as defined above and Z is an alkoxy, mercapto, carboxy or sulfonyl moiety resulting from the condensation of the oxy- or hydroxy (alkyl) tin orthosulfite with an alcohol, mercaptan, carboxylic acid or anhydride and sulfonic acid, respectively. When polymeric compounds are formed the formula may be represented as shown above when Z is

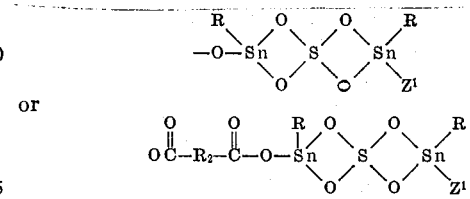

and $Z^1$ is Z or a terminal hydroxy group.

terminal hydroxy group. The condensation reaction may be carried out at temperatures and in solvents similar to those used for the oxidation reaction or may be carried out without a solvent.

Some examples of functional compounds susceptible to reaction with bis(hydroxy alkyltin) orthosulfites or poly [oxy (alkyl) tin orthosulfites] are alcohols, such as isooctyl-, dodecyl-, and octadecyl alcohols, phenol, para-alkylated phenols, naphthols; mercaptans, such as dodecyl-and phenyl mercaptans; carboxylic acids and anhydrides such as maleic, acetic, benzoic, dodecanoic acids and anhydrides; and sulfonic acids such as p-toluene sulfonic, and its chlorinated derivatives, sulfosuccinic, methane sulfonic, hexadecane sulfonic and sulfanilic acids.

EXAMPLE I

Bis (hydroxy-butyltin) orthosulfite

Twelve grams of n-butylthiostannoic acid were refluxed in 50 ml of toluene and 18 g of tert. butyl hydroperoxide was added dropwise over 1 hour. The reaction mixture was refluxed for 3 hours, or until the evolution of isobutene had ceased, and was then filtered. An off-white crystalline solid weighing 24 g was recovered and it represented a quantitative amount of bis (hydroxy-butyltin) orthosulfite melting at 260° C. with decomposition. Infrared spectroscopy of the dry product reveals unambiguously the presence of the tin bonded hydroxyl group and the tetradentate character of the $SO_4$ group is indicated by Mössbauer spectroscopy.

Analysis: Calculated for $C_8H_{20}O_6SSn_2$: %C, 19,9; H, 4.2: O, 19.9; S, 6.6: Sn, 49.2 Found: %C, 20.1; H, 4.0; O, 19.5; S, 6.9; Sn, 48.9.

If the reaction is conducted in hydrocarbon solvents with boiling points lower than toluene (e.g., hexane), the molecular weight of the sulfate appears to be monomeric. If the boiling point is higher (e.g., xylenes), higher polymeric stannoxy structures result.

EXAMPLE II

Following the procedure of Example I, 19.9 of methyl stannoic acid was reacted with 45 g of 3-hydroperoxy cyclohexene in n-hexane. A quantitative yield of bis (hydroxy-methyltin) orthosulfite melting at 210° C. with decomposition was obtained. The cyclohexadiene by-product may be separated from the hexane by distillation.

Analysis: Calculated for $C_2H_8O_6SSn_2$: % C, 6.0 H, 2.0; O, 24.2; S, 8.1; Sn, 59.7 Found: % C, 6.2; H, 1.9; O, 24.6; S, 8.0; Sn, 60.2.

EXAMPLE III

To a refluxing suspension of 4.8 g of bis (hydroxybutyltin) orthosulfite was added 0.7 g of glacial acetic acid. The reaction was infrared monitored until disappearance of the adsorption band characteristic of the hydroxyl group. The water of condensation, amounting to 0.8 ml, was collected and 5.1 g of bis (acetoxy-butyltin) orthosulfite was filtered therefrom, washed with petroleum ether and dried. It had a m.p. of 192°–186° C. with decomposition.

Analysis: Calculated for $C_{12}H_{24}O_8SSn_2$: % C, 25.5; H, 4.3; O, 22.6; S, 5.6; Sn, 51.9. Found: % C24.3, H, 4.4; O, 20.9; S, 6.1; Sn, 40.3

EXAMPLE IV

Paratoulene sulfonic acid (3.5g) was added to a suspension of 4.8 g of bis (hydroxy-butyltin) orthosulfite in 100 ml of benzene. The reaction mixture was refluxed until 0.8 ml to water had been condensed. Filtration of the mixture yielded 7.1 g of a fine white and very hydroscopic power, which decomposed at 110° C.

Analysis: Calculated for $C_{22}H_{32}O_{10}S_3Sn_2$: % C, 33.4; H, 4.1; O, 20.2; S, 12.2; Sn, 30.0 Found: % C, 32.3; H, 4.6; O, 21.2; S, 11.9; Sn, 29.7

EXAMPLE V

Bis(hydroxy-octyltin) orthosulfite was obtained by oxidation of octylthiostannoic acid with triphenylmethyl hydroperoxide following the procedure of Example I. Bis (hydroxy isooctyltin) orthosulfite, bis (hydroxy decyltin) orthosulfite, bis (hydroxy dodecyltin) orthosulfite, bis (hydroxy cyclohexyltin) orthosulfite and bis (hydroxy-2-ethylhexyltin) orthosulfite are all prepared using either the procedure of Example I or Example II.

Following essentially identical procedures to those described in Examples III and IV, the various compounds illustrated in Table A were prepared.

TABLE A

| R | ZH | Z | Product | Melting point, ° C.* | Calcd. Sn | Calcd. C | Found Sn | Found C |
|---|---|---|---|---|---|---|---|---|
| $C_4H_9$ | Methyl alcohol | $CH_3O$ | Bis(methoxy-butyltin) orthosulfite | | | | | |
| $C_{12}H_{25}$ | Ethyl alcohol | $C_4H_9O-$ | Bis(ethoxy-dodecyltin)orthosulfite | | | | | |
| $C_8H_{17}$ | Octyl alcohol | $n-C_8H_{17}O-$ | Bis(octoxy-octyltin)orthosulfite | | | | | |
| $CH_3$ | Isooctyl alcohol | $i-C_8H_{17}O-$ | Bis(isooctoxy-methyltin) orthosulfite | 155d | 37.7 | 38.1 | 38.2 | 37.0 |
| ⟨H⟩- | Lauryl alcohol | $C_{12}H_{25}O-$ | Bis(lauroxy cyclohexyltin) orthosulfite. | | | | | |
| $C_{10}H_{21}$ | Hexadecyl alcohol | $C_{16}H_{33}O-$ | Bis(hexadecoxy decyltin) orthosulfite | | | | | |
| $C_4H_9$ | Stearyl alcohol | $C_{18}H_{37}O-$ | Bis(stearoxy-butyltin) orthosulfite | | | | | |
| $CH_3$ | Cyclohexyl alcohol | ⟨H⟩-O- | Bis(cyclohexoxy-methyltin)orthosulfite. | | | | | |
| $C_8H_9$ | Phenol | ⟨⟩-O- | Bis(phenoxy-octyltin) orthosulfite. | | | | | |
| $C_4H_9$ | Benzyl alcohol | ⟨⟩-$CH_2O-$ | Bis(benzyloxy-butyltin) orthosulfite | | | | | |
| $C_4H_9$ | α Naphthol | ⟨⟩⟨⟩-O- | Bis(α-naphthoxy-butylti-) orthosulfite. | | | | | |
| $C_8H_{17}$ | 3-phenyl propanol | ⟨⟩-$CH_2CH_2CH_2O-$ | Bis (3-phenyloxy-octyltin) orthosulfite. | | | | | |
| $C_8H_{17}$ | p-Cresol | $CH_3$⟨⟩-O- | Bis (p-toloxy-octyltin) orthosulfite | | | | | |
| $C_4H_9$ | p-Nonylphenol | $C_9H_{19}$⟨⟩-O- | Bis (p-nonylphenoxy-butyltin) orthosulfite. | 76d | 26.8 | 51.4 | 27.5 | 50.9 |

TABLE A — Continued

| R | ZH | Z | Product | Melting point, °C.* | Caled. Sn | Caled. C | Found Sn | Found C |
|---|---|---|---|---|---|---|---|---|
| $CH_3$ | 3,5-dimethyl phenol | $CH_3$-C$_6$H$_3$(CH$_3$)-O— (3,5-dimethylphenoxy) | Bis(3,5-dimethylphenoxymethyltin) orthosulfite. | | | | | |
| $C_8H_{17}$ | Butyl mercaptan | $C_4H_9S$— | Bis(butylthio-octyltin)orthosulfite | | | | | |
| $C_8H_{17}$ | Octyl mercaptan | $C_8H_{17}S$— | Bis(octylthio-octyltin)orthosulfite | | | | | |
| $C_4H_9$ | Isooctyl mercaptan | i-$C_8H_{17}S$— | Bis(isooctylthio-butyltin) orthosulfite. | | | | | |
| $C_8H_{17}$ | Lauryl mercaptan | $C_{12}H_{25}S$— | Bis(laurylthio-octyltin)orthosulfite | 130d | 24.7 | 49.8 | 23.9 | 48.0 |
| $C_4H_9$ | Stearyl mercaptan | $C_{18}H_{37}S$— | Bis(stearylthio-butyltin)orthosulfite | | | | | |
| $CH_3$ | Benzyl mercaptan | C$_6$H$_5$CH$_2$-S— | Bis(benzylthio-methyltin)orthosulfite | 125d | 39.3 | 31.7 | 37.7 | 32.9 |
| $C_4H_9$ | α-Naphthyl mercaptan | (α-naphthyl)-S— | Bis(α naphthylthio-butyltin) orthosulfite. | | | | | |
| $C_8H_{17}$ | p-Tolyl mercaptan | $CH_3$-C$_6$H$_4$-S— | Bis(p-tolylthio-octyltin)orthosulfite | | | | | |
| $C_{12}H_{25}$ | Acetic acid | $CH_3C(O)-O$— | Bis(acetoxy-lauryltin) orthosulfite | | | | | |
| $C_8H_{17}$ | Propionic acid | $C_2H_5C(O)-O$— | Bis(propionyloxy-octyltin) orthosulfite. | | | | | |
| $C_4H_9$ | Lauric acid | $C_{11}H_{23}C(O)-O$— | Bis(lauroyloxy-butyltin) orthosulfite. | | | | | |
| $C_4H_9$ | Stearic acid | $C_{17}H_{35}C(O)-O$— | Bis(stearoyloxy-butyltin) orthosulfite. | | | | | |
| $C_8H_{17}$ | Benzoic acid | C$_6$H$_5$-C(O)-O— | Bis(benzoxy-octyltin) orthosulfite | 225d | 29.6 | 44.8 | 30.2 | 42.5 |
| $C_4H_9$ | p-Toluic acid | $CH_3$-C$_6$H$_4$-C(O)-O— | Bis(p-toluyloxy-butyltin) orthosulfite. | | | | | |
| $C_8H_{17}$ | Oxalic acid | —O—C(O)—C(O)—O— | Poly[[bis(monooctyltin) orthosulfite] oxalate]. | | | | | |
| $CH_3$ | Malonic acid | —O—C(O)—CH$_2$—C(O)—O— | Poly[[bis(monomethyltin) orthosulfite]malonate]. | | | | | |
| $CH_3$ | Succinic acid | —O—C(O)—CH$_2$—CH$_2$—C(O)—O— | Poly[[bis(monomethyltin) orthosulfite]succinate]. | | | | | |
| $C_4H_9$ | Azelaic acid | —O—C(O)(CH$_2$)$_7$C(O)—O— | Poly[[bis(monobutyltin) orthosulfite]azelate]. | | | | | |
| $CH_3$ | Maleic anhydride | —O—C(O)—CH=CH—C(O)—O— | Poly[[bis(monomethyltin) orthosulfite]maleate]. | 300 | 49.8 | 15.0 | 48.9 | 14.8 |
| $C_4H_9$ | Glutaconic acid | —O—C(O)CH=CHCH$_2$—C(O)—O— | Poly[[bis(monobutyltin) orthosulfite]glutaconate]. | | | | | |
| $CH_3$ | 1,1-cyclohexylidene bis(mercaptopropionic acid). | (—O—C(O)CH$_2$CH$_2$S$_2$)$_2$C(C$_5$H$_{10}$) | Poly[[bis(monomethyltin) orthosulfite] 1,1-cyclohexylidene bis(mercaptoproponate)]. | | | | | |
| $C_8H_{17}$ | Thiodipropionic acid. | —O—C(O)CH$_2$CH$_2$SCH$_2$CH$_2$C(O)—O— | Poly[[bis (monoctyltin) orthosulfite] thiodipropionate]. | | | | | |
| $C_8H_{17}$ | Monobutyl ester of oxalic acid. | $C_4H_9O$-C(O)-C(O)-O— | [Bis(monooctyltin) orthosulfite]monobutyl oxalate. | | | | | |
| $C_4H_9$ | Monoisooctyl ester of maleic acid. | i-$C_8H_{17}O$-C(O)CH=CHC(O)-O— | [Bis(monobutyltin orthosulfite] monoisooctyl maleate. | | | | | |
| $CH_3$ | Monobenzyl ester of malonic acid. | C$_6$H$_5$CH$_2$O-C(O)CH$_2$C(O)-O— | [Bis(monomethyltin)orthosulfite] monobenzyl malonate. | | | | | |

TABLE A — Continued

| R | ZH | Z | Product | Melting point, °C.* | Calcd. Sn | Calcd. C | Found Sn | Found C |
|---|---|---|---|---|---|---|---|---|
| $CH_3$ | Methylsulfonic acid | $CH_3SO_3-$ | Bis(methylsulfito-methyltin) orthosulfite. | | | | | |
| $CH_3$ | Butylsulfonic acid | $C_4H_9SO_3-$ | Bis(butylsulfito-methyltin) orthosulfite. | | | | | |
| $C_4H_9$ | Lauryl sulfonic acid. | $C_{12}H_{25}SO_3-$ | Bis(laurylsulfito-butyltin) orthosulfite. | | | | | |
| $C_8H_{17}$ | Hexadecyl sulfonic acid. | $C_{16}H_{33}SO_3-$ | Bis(hexadecylsulfito-octyltin) orthosulfite. | 175d | 20.3 | 49.2 | 22.0 | 48.6 |
| $CH_3$ | p-Tolyl sulfonic acid. | 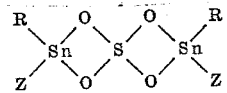 | Bis(p-tolylsulfito-methyltin) orthosulfite. | | | | | |
| $C_4H_9$ | Sulfonilic acid | $H_2N-\langle\rangle-SO_3-$ | Bis(p-aminophenylsulfito-butyltin) orthosulfite. | | | | | |
| $C_4H_9$ | 3-chloro-4-methyl-phenyl sulfonic acid. | 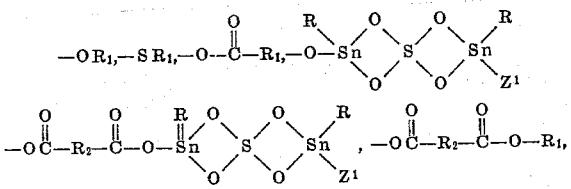 | Bis(3-chloro-4-methylphenyl sulfito-butyltin) orthosulfite. | | | | | |
| $C_8H_{17}$ | Sulfosuccinic acid | 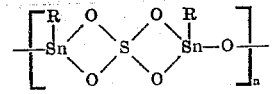 | Poly[[bis(monooctyltin)orthosulfite] sulfitosuccinate]. | | | | | |

EXAMPLE VI

Stearyl stearate was prepared by reacting equimolar amounts of stearic acid and stearyl alcohol at 120° C in presence of 0.2 percent of p-toluene sulfonic acid as a catalyst. The reaction was stopped at an acid value of 20 and over the next few days a significant drift of the acid value was observed. After 1 week of standing the acid value had dropped to 15. A similar experiment was carried out with 0.2 percent of bis(hydroxy-butyltin) orthosulfite. Again the reaction was stopped at A V 20 and no subsequent drift was observed, even after several months at room temperature. While the organotin orthosulfite is as active as the traditional p-toluene sulfonic acid in catalyzing the condensation reaction, it enhances the stabilization of a desired acid value and prevents post reaction drift.

EXAMPLE VII

Pentaerythritol tetrakis cerylate was prepared by reacting one mold of pentaerythritol with four moles of hexacosyl alcohol at 150° C in presence of 0.3 percent sulfuric acid as a catalyst. Quantitative condensation of water, marked the completion of the esterification after 67 minutes. A similar experiment was conducted using 0.3 percent of Bis (hydroxy-butyltin) orthosulfite as a catalyst and reaction was completed after only 32 minutes.

EXAMPLE VIII

Tests for the mildew resistance imparted by fungicides were carried out according to Federal Specification CCC-T-191 method 5751-1 (May 6, 1953) as follows: Solutions of 10 percent, 5 percent, 4 percent and 2 percent respectively of bis (p-tolylsulfito-butyltin) orthosulfite in methyl-ethyl ketone were prepared and a piece of untreated cotton cloth was dipped in each solution for several minutes to deposit a sufficient quantity of fungicide. A piece of the same cloth was left unprotected and used as a control. The test samples were than air dried and placed with the control on a nutrient agar inoculated with the organism Chaetomium Globosum. During a 14 day incubation at 30° C, the control failed after 7 days while the treated samples passed the 14 day test at all levels while inhibiting all fungus growth.

What is claimed is:

1. A compound corresponding to the formula $$\begin{array}{c} R \diagdown \quad O \diagdown \quad O \diagup R \\ Sn \diagdown S \diagup Sn \\ Z \diagup \quad O \diagup \quad O \diagdown Z \end{array}$$

wherein R is alkyl having one to 20 carbon atoms and Z is selected from the group consisting of hydroxyl, $$-OR_1, -SR_1, -O-\overset{O}{\underset{\|}{C}}-R_1, -O-\overset{R}{\underset{\diagdown}{Sn}}\diagdown\overset{O}{\underset{S}{\diagup}}\diagdown\overset{O}{\underset{O}{\diagup}}\overset{R}{\underset{Sn}{\diagdown}}{Z^1}$$

$$-O\overset{O}{\underset{\|}{C}}-R_2-\overset{O}{\underset{\|}{C}}-O-\overset{R}{\underset{\diagdown}{Sn}}\diagdown\overset{O}{\underset{S}{\diagup}}\diagdown\overset{O}{\underset{O}{\diagup}}\overset{R}{\underset{Sn}{\diagdown}}{Z^1}, -O\overset{O}{\underset{\|}{C}}-R_2-\overset{O}{\underset{\|}{C}}-O-R_1,$$

and $-SO_3R_1$ wherein $R_1$ is selected from the group consisting of alkyl, aryl, aralkyl and alkaryl having one to 20 carbon atoms, $R_2$ is a divalent radical selected from the group consisting of alkylene having one to 10 carbons, alkenylene having one to 10 carbons, and sulfur interrupted alkylene and $Z^1$ is Z or —OH.

2. The compound of claim 1 wherein R has one to 12 carbon atoms and Z is hydroxyl.

3. The compound of claim 2 wherein R is butyl.

4. The compound of claim 2 wherein R is methyl.

5. A condensation product of the compound of claim 2 having repeat units corresponding to the formula $$\left[\begin{array}{c} R \diagdown \quad O \diagdown \quad O \diagup R \\ Sn \diagdown S \diagup Sn-O \\ \diagup \quad O \diagup \quad O \diagdown \end{array}\right]_n$$

wherein n is 2 to 20

6. A compound of claim 1 wherein R had one to 12 carbon atoms and Z is selected from the group consisting of isooctoxy, p-nonylphenoxy, laurylthio, benzylthio, acetoxy, benzoxy, maleato, hexadecylsulfito and p-tolylsulfito.

7. A compound of claim 6 wherein R is butyl and Z is acetoxy.

8. A compound of claim 6 wherein R is butyl and Z is p-tolysulfito.

9. A method of preparing a compound of claim 1 wherein Z is hydroxy which comprises oxidizing an alkylthiostannoic acid having one to 12 carbon atoms with an organic hydroperoxide in the presence of a hydrocarbon solvent.

10. The method of claim 9 wherein the organic hydroperoxide is selected from the group consisting of methyl hydroperoxide, ethyl hydroperoxide, isopropyl hydroperoxide, butyl hydroperoxide, tert, butyl hydroperoxide, triphenylmethyl hydroperoxide, 3-hydroperoxycyclohexene, and 2,3-dimethyl-3-hydroperoxy butene-1 and the solvent is selected from the group consisting of n-hexane, n-octane, benzene, ethylbenzene, toluene and xylene.

11. The method of claim 10 wherein the oxidation product is condensed with a material selected from the group consisting of alcohols, carboxylic acid, carboxylic anhydrides, mercaptans and sulfonic acids.

12. The process of claim 11 wherein said material is selected from the group consisting of isooctyl alcohol, p-nonylphenol, lauryl mercaptan, benzyl mercaptan, acetic acid, benzoic acid, maleic anhydride, hexadecyl sulfonic acid and p-tolyl sulfonic acid.

* * * * *